J. L. WOODBRIDGE.
SYSTEM OF ELECTRICAL DISTRIBUTION.
APPLICATION FILED JUNE 19, 1909.

999,690.

Patented Aug. 1, 1911.

WITNESSES:

INVENTOR
Joseph L. Woodbridge
BY
Augustus B. Stoughton
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

999,690.   Specification of Letters Patent.   Patented Aug. 1, 1911.

Application filed June 19, 1909. Serial No. 503,151.

*To all whom it may concern:*

Be it known that I, JOSEPH LESTER WOODBRIDGE, a citizen of the United States, residing at Philadelphia, in the county of Philadelphia and State of Pennsylvania, have invented a certain new and useful System of Electrical Distribution, of which the following is a specification.

My invention relates to systems of electrical distribution in which a storage battery is used to compensate for fluctuations of load on an electric circuit, and in which a field coil to which current is supplied by apparatus responsive to fluctuations of load on the electric circuit is employed to control the charge and discharge of the battery.

The object of my invention is to provide more convenient means for putting the controlling apparatus into operation or for instantly neutralizing its action at will without interrupting the main connections from the battery to the circuit or opening any field circuits.

Broadly speaking, my invention includes, in combination with the regulating field coil and its source of exciting current, a shunt circuit of comparatively low resistance which may be connected to suitable terminals of the source, in parallel with the field, in such manner that the resulting flow of current through said circuit will reduce the regulating voltage of the source to a negligible value and stop its regulating action, the source being so designed and the terminals so arranged that a comparatively small flow of current will produce this result. The terminals used for this purpose, or at least some of them will be different from those used to supply current to the regulating field coil. A switch is provided in the shunt circuit permitting the circuit to be made or broken at will and an indicating instrument is also connected into this circuit, which will show when the adjustment of the regulating apparatus is suitable to permit opening the aforesaid switch.

My invention will be better understood by reference to the following description in connection with the accompanying drawings, in which—

Figure 1:
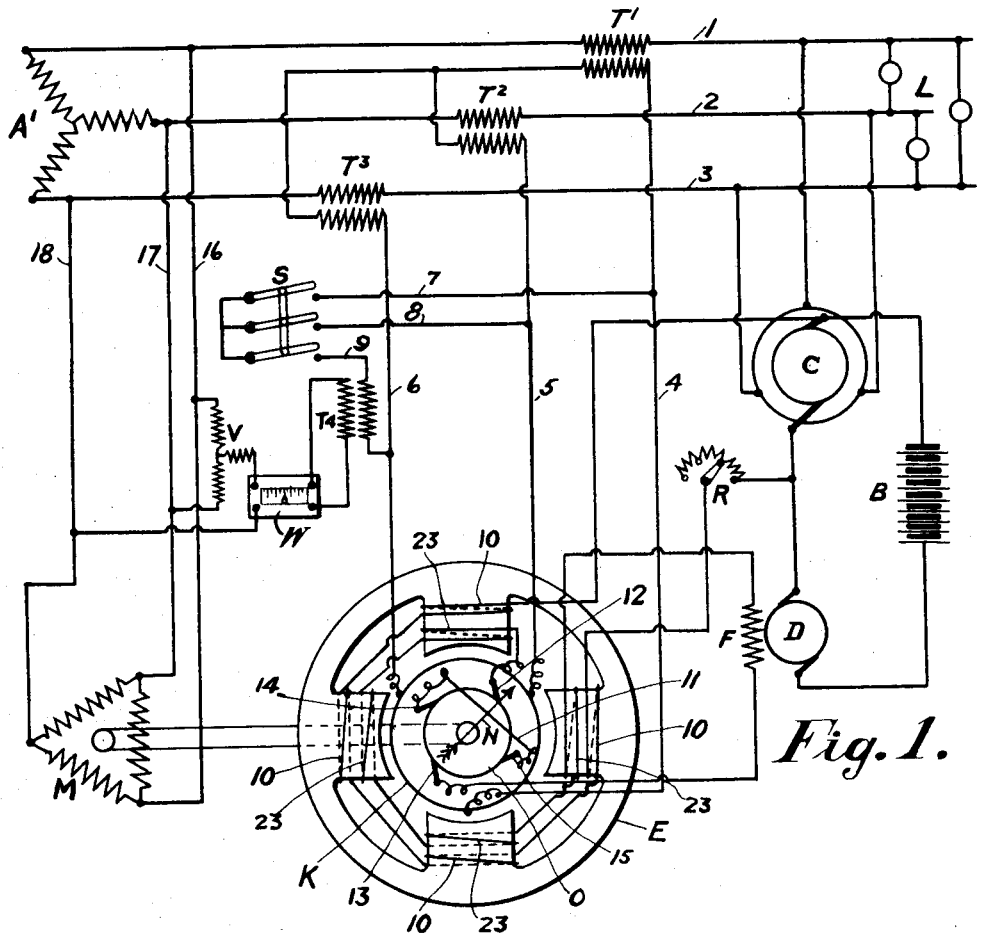
Figure 2:
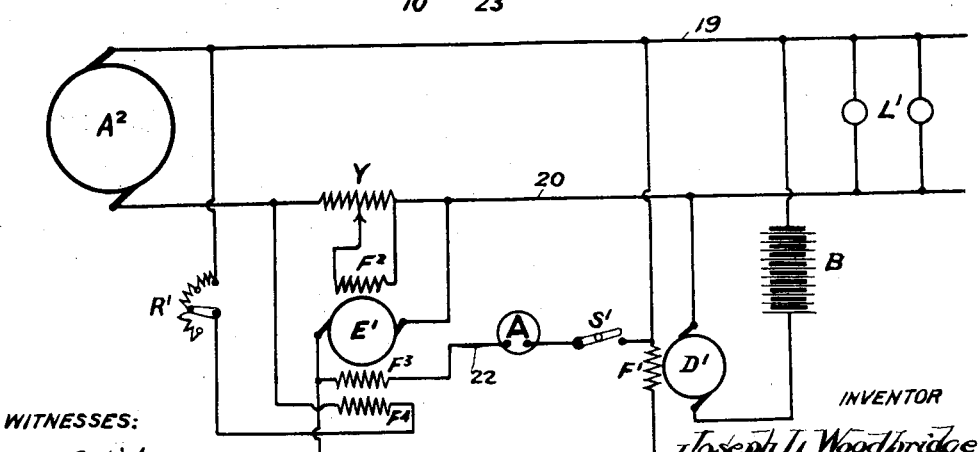

Figure 1 shows one embodiment of my invention applied to a system including a three phase circuit with a battery connected to regulate the fluctuations of load on said circuit. Fig. 2, shows a modification of my invention applied to a system in which a direct current circuit is provided with a regulating battery.

In Fig. 1, $A^1$ is a three phase alternator connected to the circuit 1, 2, 3, which supplies a fluctuating load L. A rotary converter C is shown, its alternating current terminals being connected to the circuit 1, 2, 3, while its direct current brushes are connected to the storage battery B. In series with the battery is the booster D with its field coil F arranged to control the charge and discharge of the battery. The field coil F is supplied with current by the exciter E. This exciter is similar to that described in Patent 870,150, issued to me under date of November 5th, 1907. It consists of a field frame provided with four internally projecting poles and an armature K provided with a bi-polar winding and a commutator O. The armature is connected by means of conductors 4, 5, and 6, to the secondaries of three current transformers $T^1$, $T^2$, $T^3$, whose primaries are connected into the circuit 1, 2, 3. The current supplied to the armature by these current transformers would produce a revolving field in the usual manner provided the armature K were stationary. The armature, however, is mechanically connected to the synchronous motor M which is electrically connected to the circuit 1, 2, 3, by conductors 16, 17, 18 and rotates said armature in a direction opposite to the direction of field rotation and in synchronism therewith, so that the field is held stationary in space in the direction of the arrow N. A field winding 10 is shown on the poles of this exciter which is supplied with current from the direct current terminals of the converter C. By means of the rheostat R the effect of this field winding may be so adjusted as to neutralize the field due to the alternating current when the latter has some predetermined value. Two pair of brushes are shown bearing on the commutator of which one pair 14—15 make contact at points of maximum potential difference due to the field produced by the alternating current. This pair of brushes is short-circuited by conductor 11. The other pair of brushes 12—13 are connected to the field F.

It will be noted that any variation in the load on the source $A^1$ above or below the value for which the rheostat R has been adjusted will produce a potential difference between the brushes 14—15 and a flow of current in conductor 11. This current by reason of the armature re-action will produce a field at right angles to the arrow N and this field will produce a voltage across the brushes 12—13 and a flow of current in the field F which by its action on the booster D will cause the battery to charge or discharge through the rotary converter C to regulate the fluctuations of load on the circuit 1, 2, 3. A series winding 23, connected between brush 12 and the field F, serves to compensate for armature re-action due to any flow of current from brush 12. A switch S is shown connected to the conductors 4, 5, 6, by means of the conductors 7—8—9. When the switch S is closed the conductors 4—5—6 are short-circuited on themselves. If this switch S is closed at the instant when the effect of the field winding 10 exactly neutralizes the effect of the alternating current from the transformers $T^1$, $T^2$, $T^3$, so that the resultant voltage developed by the armature K is zero, there will be no flow of current through the conductors 7, 8 and 9. If, however, the load on the generator $A^1$, is somewhat in excess of that required for this exact neutralization the excess current will flow through the conductors 7, 8, and 9, so that the voltage developed by the armature K will remain zero. The flow of current in the conductors 7, 8, and 9 will be an indication as to whether or not the exact adjustment has been effected. An indicating instrument W is therefore shown connected by means of the current transformer $T^4$ into the conductor 9 to indicate when the proper adjustment has been made. As shown in Fig. 1, this indicating instrument is an alternating current wattmeter, current being supplied to it from the current transformer $T^4$, while the voltage connection is made in the usual manner by means of the Y connected resistance V to the conductors 16, 17 and 18, which are connected to the circuit 1, 2, 3. A wattmeter is utilized for this purpose for the reason that it is the energy component of the alternating current to which the exciter E responds and which must be neutralized by the excitation of the field winding 10.

The operation of putting the apparatus into service will then be as follows: The switch S being closed the exciter E may be started up but will transmit no current through the field F. The main connections from the battery to the converter C and from the latter to the circuit 1, 2, 3 may be made, the battery merely floating on the system without charging or discharging. The rheostat R is now adjusted until at some predetermined load on the source $A^1$ the indication of the wattmeter W is zero. At this instant the switch S may be opened and the regulating apparatus will immediately be in operation holding the load on the generator at the predetermined value above mentioned.

If for any reason it is desired to stop the regulating function of the apparatus, the switch S may be instantly closed without any previous adjustment whatever and the voltage of the exciter E will instantly be reduced to zero and no current will flow through the field F. The switch S in fact serves to establish a short-circuit across the booster field F by way of the armature winding of the exciter E and the high armature re-action of this exciter prevents any excessive flow of current through the conductors 7, 8, and 9, when the switch S is closed even though the fields of the exciter are excited by the winding 10. The battery will then continue to float on the system, neither charging nor discharging, provided the voltage of the alternator remains constant and at the proper value.

In Fig. 2, is shown a direct current generator $A^2$ connected to the direct current circuit 19, 20, which is supplying a fluctuation load $L^1$. A battery B with its booster $D^1$ is connected across the circuit 19, 20. The exciter $E^1$ is also connected across the circuit 19, 20, with the field $F^1$ of the booster $D^1$ in series with its armature. The combination of the generator $A^2$ and the exciter $E^1$ in series may be considered the exciting source for the field winding $F^1$, since it is the difference of potential between the two that determines the flow of current in said winding. The exciter $E^1$ is provided with three field windings $F^2$, $F^3$ and $F^4$. The winding $F^2$ is connected to an adjustable shunt Y in conductor 20 and its effect on the exciter $E^1$ will therefore vary with changes of load on the generator $A^2$. The field winding $F^4$ is connected across the circuit 19, 20 and its effect is therefore constant and may be adjusted by the rheostat $R^1$. The field winding $F^4$ may be connected to assist or oppose $F^2$ as may be desired. At some predetermined value of the load on the generator $A^2$ the combined effect of the two field windings $F^2$ and $F^4$ will produce a voltage in the exciter $E^1$ equal to that across the conductors 19, 20 and no current will flow through the field winding $F^1$ of the booster. Any variation in the load on the generator $A^2$ will, however, destroy this balance of voltage provided the switch $S^1$ is open and will cause a flow of current through the field $F^1$ to control the charge and discharge of the battery B. The field winding $F^3$ is connected into the circuit 22 containing the ammeter A and the switch $S^1$, this circuit being connected in parallel with the field $F^1$. The field winding $F^3$ is so designed that a flow of current in it will produce a change of voltage in the exciter $E^1$ in the direction to oppose said flow of current. The switch $S^1$ may therefore be closed at any time and the resulting flow of current through the field winding $F^3$ will produce a practical equilibrium of voltage between the exciter E¹ and the circuit 19, 20 and the field winding F¹ will at the same time be short-circuited since the resistance of the field winding F³ is small as compared with the field winding F¹. Under these conditions the battery will merely float across the circuit 19, 20 without charging or discharging. The regulating apparatus in Fig. 2 may be put in operation in the same manner as that in Fig. 1. Starting with the switch S¹ closed, the exciter E¹ may be started up and the main connections between the battery, booster and circuit 19, 20 may be made. The rheostat R¹ or the adjustable shunt Y or both may then be so adjusted that the current in the circuit 22 as indicated by the ammeter A will be reduced to zero at some predetermined load on the generator A². At this instant the switch S¹ may be opened, and the apparatus will immediately assume its regulating function.

It will be observed that the switch S in Fig. 1 and the switch S¹ in Fig. 2 establish in each case a circuit of low resistance in parallel with the regulating field windings F and F¹, the current in which circuit neutralizes the regulating action of the exciter and also provides a means for determining when the proper adjustment of this apparatus has been made for holding a predetermined load on the generating source. The terminals of the exciter across which this low resistance circuit is connected are so chosen that the voltage characteristic at these terminals is more drooping than it is at the terminals connected to the regulating field winding, so that a comparatively small and harmless flow of current through said low resistance circuit will neutralize the regulating voltage of the exciter, while the current delivered to the field winding will not have this effect. In Fig. 1, this result is accomplished by connecting the low resistance circuit across the alternating current terminals of the exciter E where the full effect of the armature reaction is felt, while the regulating field coil F is connected to the direct current brushes in series with the field winding 23 which compensates for armature reaction. In Fig. 2, this result is accomplished by connecting the low resistance circuit in series with the reverse series winding F³ which gives a pronounced drooping characteristic, while the regulating field F¹ is connected so as to exclude the winding F³.

It will be obvious that many modifications may be made in the details without departing from the spirit of the invention, and What I claim therefore and desire to secure by Letters Patent is:

1. In combination a storage battery, means including a field coil for controlling the battery current, apparatus adapted to develop a regulating potential for controlling the current in said field coil and provided with one set of terminals connected to said coil and another set of terminals whereat the potential characteristic is more drooping than at the first set, a supplemental conducting circuit, and means for connecting said circuit to the second set of terminals whereby a harmless flow of current through said circuit will neutralize the regulating voltage of the apparatus.

2. In combination a storage battery, means including a field coil for controlling the battery current, apparatus adapted to develop a regulating potential for controlling the current in said field coil and provided with one set of terminals connected to said coil, and another set of terminals whereat the potential characteristic is more drooping than at the first set, a supplemental conducting circuit, means for connecting said circuit to the second set of terminals, and apparatus for indicating a flow of current in said circuit.

3. In combination a source of regulating potential, two circuits connected to said source in parallel relation whereof one is a regulating circuit and the other is a supplemental conducting circuit, means for disconnecting the supplemental circuit, and a winding connected into one of said circuits and adapted to produce a difference in the relative potential characteristics applied by the source to the two circuits whereby that applied to the supplemental circuit is the more drooping.

4. In combination a source of regulating potential, two circuits connected to said source in parallel relation whereof one is a regulating circuit and the other is a supplemental conducting circuit, means for disconnecting the supplemental circuit, a winding connected into one of said circuits and adapted to produce a difference in the relative potential characteristics applied by the source to the two circuits whereby that applied to the supplemental circuit is the more drooping, and means for indicating the electrical condition of the supplemental circuit.

5. In combination a source of regulating potential, two circuits connected to said source in parallel relation, whereof one is a regulating circuit and the other is a supplemental conducting circuit, means for disconnecting the supplemental circuit, a winding connected into one of said circuits and adapted to produce a difference in the relative potential characteristics applied by the source to the two circuits whereby that applied to the supplemental circuit is the more drooping, and means for indicating when a predetermined electrical condition obtains in the supplemental circuit.

6. In combination a source of regulating potential, two circuits connected to said source in parallel relation, whereof one contains a regulating field coil and the other is a supplemental conducting circuit, a winding connected into one of said circuits and adapted to produce a difference in the relative potential characteristics applied by the source to the two circuits whereby that applied to the supplemental circuit is the more drooping, and means for disconnecting the supplemental circuit.

7. In combination a source of regulating potential, two circuits connected to said source in parallel relation whereof one contains a regulating field coil and the other is a supplemental conducting circuit, a winding connected into one of said circuits and adapted to produce a difference in the relative potential characteristics applied by the source to the two circuits whereby that applied to the supplemental circuit is the more drooping, means for indicating when a predetermined electrical condition obtains in the supplemental circuit and means for disconnecting said supplemental circuit.

8. In combination an alternating current circuit, an armature and its field frame, means for developing in said armature a field revolving with respect thereto and responsive to the load on the alternating current circuit including alternating current terminals and appropriate connections, means for driving the armature in the opposite direction to that of the field rotation and in synchronism therewith, a field winding on the field frame adapted to neutralize said field at some predetermined load on the alternating current circuit, a commutator connected to the armature, one pair of brushes bearing on the commutator at points of potential difference due to said field, a conducting circuit connecting said brushes and adapted to permit a flow of current to produce a second field, a second pair of brushes bearing on the commutator at points of potential difference due to the second field, a regulating field coil connected to the second pair of brushes, a winding on the field frame in series between the second pair of brushes and the regulating field coil and adapted to neutralize armature re-action, a supplemental conducting circuit, and means for connecting said circuit across the alternating current terminals.

9. In combination, an alternating current circuit, an armature and its field frame, means for developing in said armature a field revolving with respect thereto and responsive to the load on the alternating current circuit including alternating current terminals and appropriate connections, means for driving the armature in the opposite direction to that of the field rotation and in synchronism therewith, a field winding on the field frame adapted to neutralize said field at some predetermined load on the alternating current circuit, a commutator connected to the armature, one pair of brushes bearing on the commutator at points of potential difference due to said field, a conducting circuit connecting said brushes and adapted to permit a flow of current to produce a second field, a second pair of brushes bearing on the commutator at points of potential difference due to the second field, a regulating field coil connected to the second pair of brushes, a winding on the field frame in series between the second pair of brushes and the regulating field coil and adapted to neutralize armature re-action, a supplemental conducting circuit, means for connecting said circuit across the alternating current terminals, and apparatus adapted to indicate the electrical condition of the supplemental circuit.

10. In combination an alternating current circuit, a storage battery, transforming apparatus connected between them and provided with a field coil for controlling the transfer of energy between them, an exciter for the field coil, direct current and alternating current means for producing in the exciter a resultant field responsive to the load on the alternating current circuit including appropriate connections from the exciter to said circuit, a supplemental conducting circuit, means for connecting said supplemental circuit across the connections from the exciter to the alternating current circuit and electrical indicating apparatus connected into the supplemental circuit.

In testimony whereof I have hereunto signed my name.

JOSEPH LESTER WOODBRIDGE.

Witnesses:
W. W. McMahon,
W. M. Ely.

---

Copies of this patent may be obtained for five cents each, by addressing the "Commissioner of Patents, Washington, D. C."